United States Patent
Rossi et al.

(10) Patent No.: US 9,556,837 B2
(45) Date of Patent: Jan. 31, 2017

(54) SPRING LOADED COMPONENT MOUNTING WITHIN FUEL TANK

(71) Applicant: Robert Bosch GmbH, Stuttgart (DE)

(72) Inventors: Paul Rossi, Waterford, MI (US);
Steven Lee, Farmington Hills, MI (US);
Paul Mason, Dearborn, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/711,442

(22) Filed: May 13, 2015

(65) Prior Publication Data
US 2015/0330341 A1    Nov. 19, 2015

Related U.S. Application Data

(60) Provisional application No. 61/992,661, filed on May 13, 2014.

(51) Int. Cl.
| | |
|---|---|
| *F02M 37/10* | (2006.01) |
| *B60K 15/03* | (2006.01) |
| *F02M 37/22* | (2006.01) |

(52) U.S. Cl.
CPC ............ *F02M 37/103* (2013.01); *B60K 15/03* (2013.01); *F02M 37/106* (2013.01); *B60K 2015/0346* (2013.01); *B60K 2015/03105* (2013.01); *B60K 2015/03111* (2013.01); *B60K 2015/03243* (2013.01); *B60K 2015/03453* (2013.01); *F02M 2037/225* (2013.01); *Y10T 29/49828* (2015.01); *Y10T 137/0402* (2015.04); *Y10T 137/794* (2015.04); *Y10T 137/85978* (2015.04);

(Continued)

(58) Field of Classification Search
CPC ................ F02M 37/106; F02M 37/103; F02M 2037/225; B60K 2015/03105; B60K 2015/03111; B60K 15/03453; B60K 2015/0346; Y10T 137/86035; Y10T 137/794; Y10T 137/0402; Y10T 137/86228; Y10T 137/86043
See application file for complete search history.

(56) References Cited

U.S. PATENT DOCUMENTS

| | | | | |
|---|---|---|---|---|
| 4,651,701 A | * | 3/1987 | Weaver | ................ F02M 37/103 123/497 |
| 4,790,185 A | * | 12/1988 | Fedelem | ................. G01F 23/30 137/565.24 |

(Continued)

*Primary Examiner* — Atif Chaudry
(74) *Attorney, Agent, or Firm* — Michael Best & Friedrich LLP (57) ABSTRACT

A fuel pump module for installation between top and bottom walls of a fuel tank. The housing defines a space accommodating a pump. The fuel pump module includes a mounting component coupled to the housing. The mounting component includes a first surface, a second surface opposite the first surface and facing the housing, a first end, and a second end opposite the first end. The mounting component and the housing are joined with a spring-loaded coupling such that the mounting component is urged away from the housing. The mounting component further includes a U-shaped recess that is concave on the first side of the mounting component. The bottom side of the housing forms a first distal end of the fuel pump module for engaging the bottom wall. The first surface of the mounting component forms a second distal end of the fuel pump module for engaging the top wall.

20 Claims, 4 Drawing Sheets

(52) U.S. Cl.
CPC ............... *Y10T 137/86035* (2015.04); *Y10T 137/86043* (2015.04); *Y10T 137/86228* (2015.04)

(56) References Cited

U.S. PATENT DOCUMENTS

| | | | | |
|---|---|---|---|---|
| 5,056,492 A | * | 10/1991 | Banse | ............... B60K 15/01 123/509 |
| 5,647,330 A | * | 7/1997 | Sawert | ............... B01D 35/26 123/509 |
| 6,298,540 B1 | * | 10/2001 | Benjey | ............... B60K 15/03 29/452 |
| 6,415,771 B1 | | 7/2002 | Mihatsch et al. | |
| 6,422,212 B1 | | 7/2002 | Faix et al. | |
| RE39,599 E | * | 5/2007 | Kanamaru | ........... F02M 37/103 123/509 |
| 2001/0050107 A1 | * | 12/2001 | Walter | ............... B60K 15/077 137/565.01 |
| 2002/0195088 A1 | | 12/2002 | Oprea | |
| 2005/0155583 A1 | * | 7/2005 | Mitsudou | ............ F02M 37/103 123/509 |
| 2010/0147858 A1 | * | 6/2010 | Haeberer | ............ B60K 15/03 220/563 |
| 2010/0175666 A1 | | 7/2010 | Nishio et al. | |
| 2011/0139128 A1 | * | 6/2011 | Zhang | ............... F02M 37/103 123/509 |
| 2011/0253106 A1 | | 10/2011 | Bartsch et al. | |
| 2011/0259300 A1 | | 10/2011 | Anetsberger et al. | |
| 2013/0239931 A1 | * | 9/2013 | Kimoto | ............... F02M 25/089 123/520 |
| 2013/0340722 A1 | | 12/2013 | Osburg et al. | |
| 2014/0075732 A1 | * | 3/2014 | Matusek | ............... B60K 15/03 29/428 |
| 2014/0198425 A1 | * | 7/2014 | Beyer | ............... B60R 16/06 361/215 |

\* cited by examiner

SPRING LOADED COMPONENT MOUNTING WITHIN FUEL TANK

CROSS-REFERENCE TO RELATED APPLICATIONS

This application claims priority to U.S. Provisional Patent Application No. 61/992,661, filed May 13, 2014, the entire contents of which are incorporated herein by reference.

BACKGROUND

The present invention relates to in-tank fuel system components, such as fuel pump modules. Fuel pump modules are positionable in fuel tanks and operable to deliver fuel to a fuel burning device, such as an internal combustion engine in a vehicle. More particularly, the invention relates to remote mounted fuel pump modules, which are operably positioned at a location of the fuel tank that is spaced apart from a fuel tank opening, which typically complicates assembly hardware and methods but is often required for certain automotive applications. The shapes of fuel tanks in modern road vehicles have numerous constraints that often lead to difficulty in designing, assembling, and servicing the fuel pump module. Due to low profile tank heights and numerous shaped features to tightly fit the fuel tank to the vehicle, acceptable fuel pump module fitting locations may be very limited and may not be at or near the fuel tank opening for easy access. When a fuel pump module must be located remote from the tank opening, simple conventional mountings which engage the tank opening flange are not feasible.

SUMMARY

In one aspect, the invention provides a fuel pump module for installation between top and bottom walls of a fuel tank. The fuel pump module includes a housing having a top side and a bottom side opposite the top side. The housing defines a space accommodating a pump. The fuel pump module also includes a mounting component coupled to the housing and spaced from the housing in a first direction. The mounting component includes a first surface, a second surface opposite the first surface and facing the housing, a first end, and a second end opposite the first end and separated from the first end along a second direction. The mounting component and the housing are joined with a spring-loaded coupling such that the mounting component is urged away from the housing in the first direction. The mounting component further includes a U-shaped recess that is concave on the first side of the mounting component. The bottom side of the housing forms a first distal end of the fuel pump module for engaging the bottom wall of the fuel tank. The first surface of the mounting component forms a second distal end of the fuel pump module for engaging the top wall of the fuel tank.

In another aspect, the invention provides a fuel tank assembly including a fuel tank having a cavity configured to store fuel, an opening providing access to the cavity, a bottom wall having at least one retention feature that defines a mounting location, and a top wall spaced from the bottom wall in a first direction. The top wall has a tank feature spaced from the opening in a second direction. The fuel tank assembly also includes an in-tank functional fuel system component positioned within the cavity. The in-tank functional fuel system component includes a base defining a first end, a mounting component having an upper surface that engages the tank feature of the top wall of the fuel tank, and a spring-loaded coupling urging the mounting component away from the base in the first direction. The upper surface of the mounting component is shaped to match a contour of the tank feature to secure the in-tank functional fuel system component in the second direction. The spring-loaded coupling provides an assembly preload between the in-tank functional fuel system component and the fuel tank when the base is positioned at the mounting location and the upper surface of the mounting component is engaged with the tank feature.

In yet another aspect, the invention provides a method for assembling a vehicular fuel tank assembly. The method includes providing a fuel pump module having a housing and a mounting component joined with the housing by a spring-loaded coupling. The housing provides a space accommodating a pump. The mounting component includes an upper surface facing away from the housing. The spring-loaded coupling urges the mounting component away from the housing. The method also includes providing a fuel tank having a bottom wall, a top wall, a cavity, and an opening. The cavity is configured to store fuel, and the opening provides access to a mounting location in the cavity between the top wall and the bottom wall. The bottom wall is spaced from the top wall in a first direction, and the top wall includes a tank feature spaced from the opening in a second direction. The bottom wall includes at least one retention feature that defines the mounting location, and the mounting location is shaped to receive the housing of the fuel pump module. The method further includes inserting the fuel pump module into the cavity through the opening of the fuel tank, compressing the spring-loaded coupling in response to maneuvering the housing along the at least one retention feature toward the mounting location in the second direction, and relieving the spring-loaded mounting feature in the first direction in response to maneuvering the housing along the second direction into the mounting location. The method finally includes moving the upper surface of the mounting component over the tank feature to secure the fuel pump module in the cavity from moving in the second direction. The upper surface of the mounting component is shaped to match a contour of the tank feature.

In yet another aspect, the invention provides a method for assembling a vehicular fuel tank assembly. The method includes providing an in-tank functional fuel system component having a base and a mounting component movable relative to the base via a spring-loaded coupling. The mounting component includes a first surface facing away from the base. The spring-loaded coupling urges the mounting component away from the base. The method also includes providing a fuel tank having a first wall, a second wall, a cavity, and an opening. The cavity is configured to store fuel, and the opening provides access to a mounting location in the cavity between the first wall and the second wall. The first wall is spaced from the second wall in a first direction. The first wall includes at least one retention feature that defines the mounting location, and the second wall includes a tank feature spaced from the opening in a second direction. The method further includes inserting the in-tank functional fuel system component into the cavity through the opening of the fuel tank, maneuvering the in-tank functional fuel system component into the mounting location with the spring-loaded in a compressed state in which the in-tank functional fuel system component defines a first height, and relieving compression in the spring-loaded coupling once the in-tank functional fuel system component is located within the mounting location, by extending the in-tank functional fuel system component to a second height.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-6 illustrate a fuel tank assembly 10 including a fuel pump module 12 and a fuel tank 14. The fuel tank assembly 10 can be an integral part of a vehicle and provided to supply fuel to a fuel-burning power source, such as an internal combustion engine (not shown). The fuel pump module 12 may include a mounting component 20, a housing 32, an electric pump 33, and may include other components such as a reservoir cup, one or more filters, a jet pump, a regulator, etc., incorporated into a single unit for installation into the fuel tank 14. In some constructions, the housing 32 defines a reservoir cup of the fuel pump module 12, which is in direct fluid communication with a pickup or inlet of the electric pump 33. Although the figures and the further description below refer specifically to the fuel pump module 12, one of ordinary skill in the art will appreciate that certain aspects of the invention apply also to other functional in-tank fuel system components that are typically or desirably assembled and/or retained within a fuel tank. Examples of such components include not only fuel pump modules, but also vapor or fuel hose retainers, vapor valves, fuel level senders, and secondary fuel pickups, among others. For the sake of brevity, each and every one of these examples is not illustrated or further discussed herein, with the understanding that, except where strictly prohibited, the description below may also be applied to any or all of the other functional in-tank fuel system components mentioned above, among others.

Figure 1:
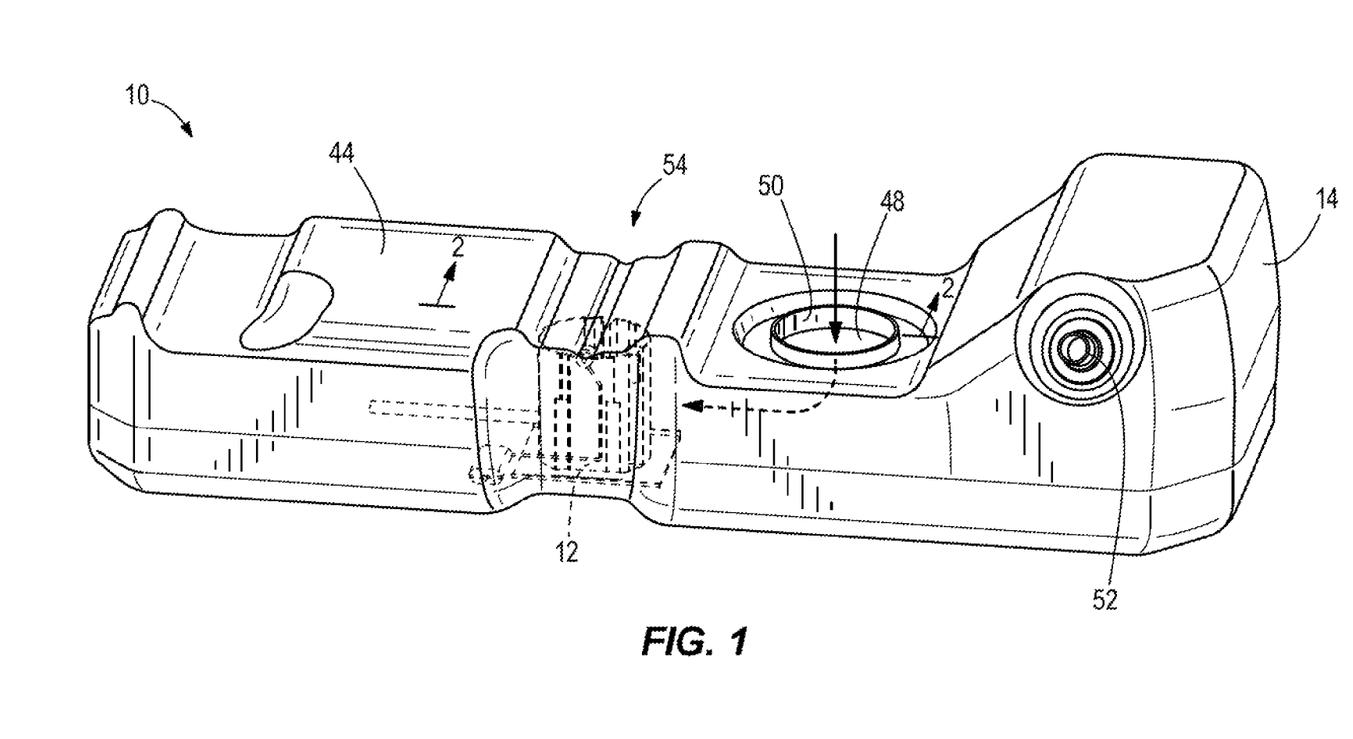
FIG. 1 is a perspective view of a fuel tank assembly, including a fuel tank and a fuel pump module mounted therein, according to a first embodiment of the invention.

As illustrated in FIG. 1, the fuel tank 14 may include a top wall 44, a bottom wall 46 spaced along a first direction A from the top wall 44, and a cavity 48 defined by the top and bottom walls 44, 46 configured to store fuel therein. The fuel tank 14 may also include a tank opening 50 providing access to a cavity 48 of the fuel tank 14 and a tank feature 54, provided with a non-flat shape. The fuel tank 14 may also include a tank filling port 52 that is provided at a location spaced from the tank opening 50.

Figure 2:
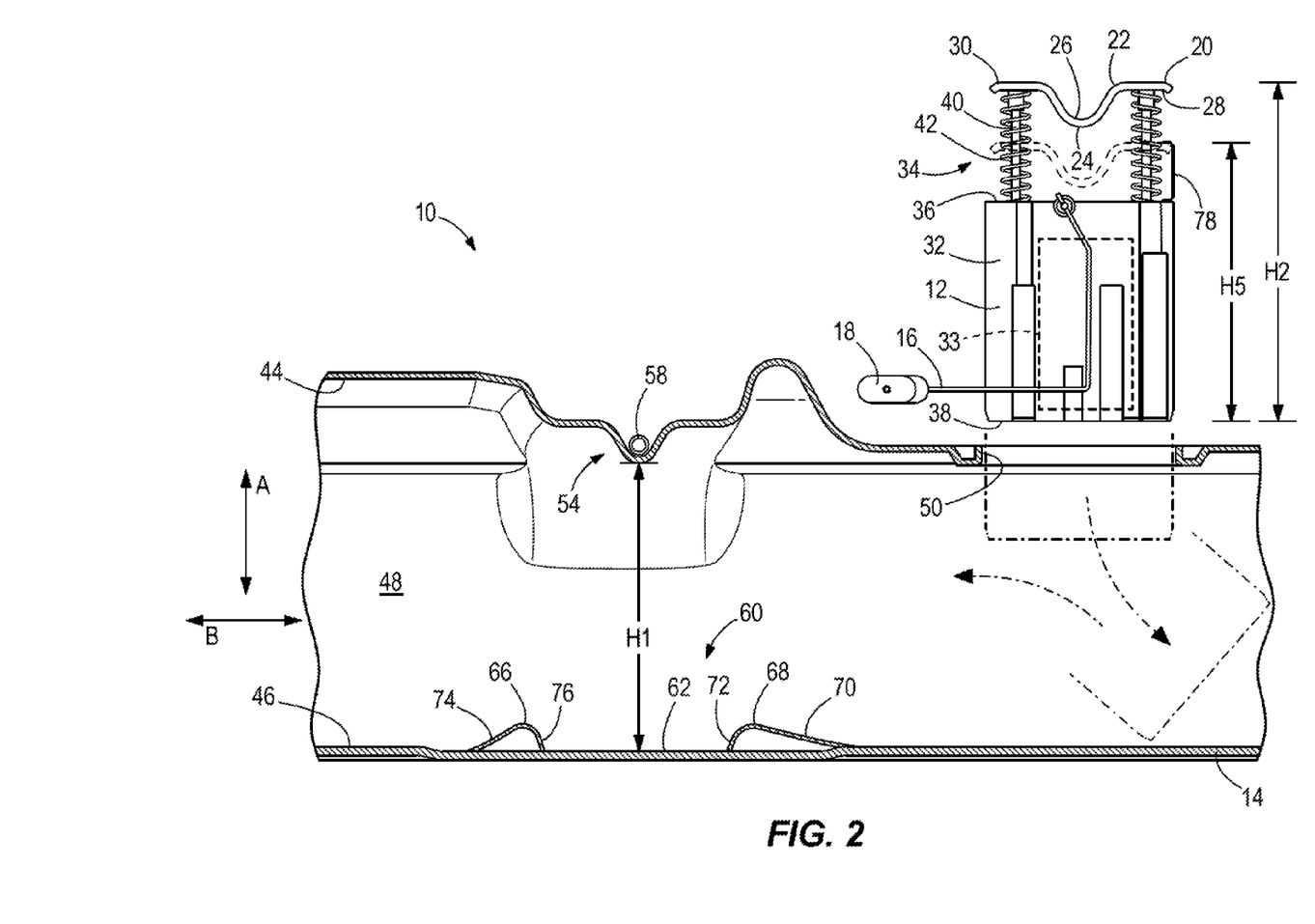
FIG. 2 is a first assembly sequence view of the fuel tank assembly of FIG. 1, prior to insertion of the fuel pump module into the fuel tank. The fuel tank is shown in cross-section.
Figure 3:
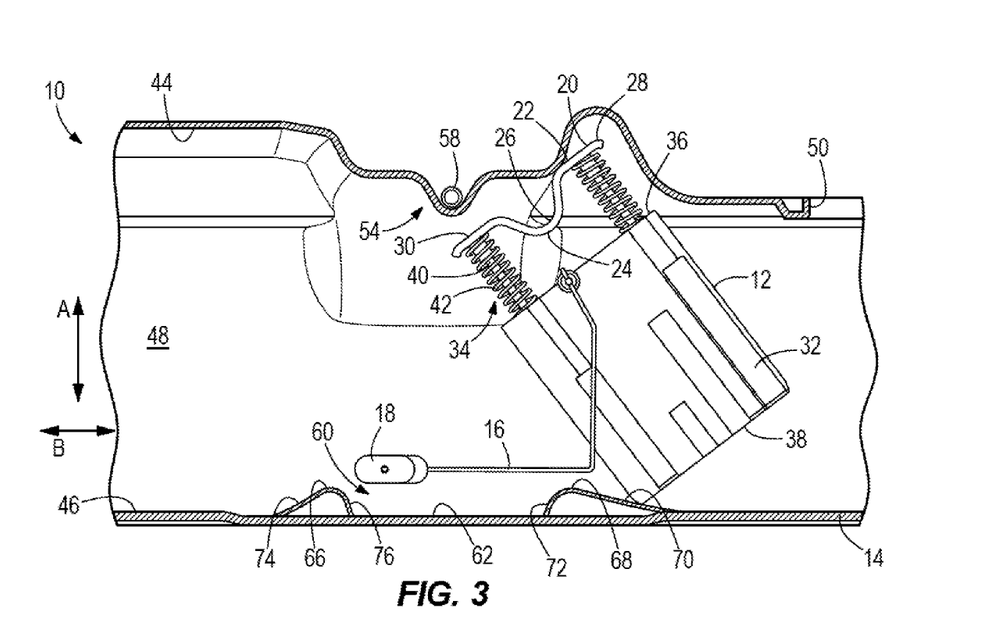
FIG. 3 is a second assembly sequence view of the fuel tank assembly of FIG. 1, illustrating the fuel pump module being maneuvered to a first position within the fuel tank at which the fuel pump module begins to engage a retention feature at a bottom wall of the fuel tank. The fuel tank is shown in cross-section.

As shown in FIG. 2, the fuel pump module 12 can also include a fuel level sender assembly 16, which has a float 18 that is buoyant in the fuel so as to be responsive to the level of fuel within the fuel tank 14 and a sensor (not shown) to detect and report the position of the float 18 for indicating fuel quantity to an operator.

The upper mounting component 20 of the fuel pump module 12 has a shape conforming to the tank feature 54. An upper surface 22 of the mounting component 20 may have a U-shape provided by an impression or recess 26 that partially or fully conforms to the surface of the tank feature 54. The upper surface 22 of the mounting component 20 may also include a first end 28 and a second end 30. The upper surface 22 can be formed to include flat portions between the recess 26 and the respective ends 28, 30. In the illustrated embodiment, the mounting component 20 is formed from a sheet of uniform material thickness such that a lower surface 24 of the mounting component 20 follows the shape defined by the upper surface 22. However, in other constructions, the mounting component 20 may have a non-uniform thickness. For example, the recess 26 in the upper surface 22 of the mounting component 20 may be formed as a section of reduced thickness in a block of material (e.g., the recess 26 being formed by molding, casting, etc., or by material removal such as milling, drilling, sanding, etc.).

The housing 32 may provide a space for the electric pump 33 between a top side 36 of the housing 32 and a bottom side 38 of the housing 32, the bottom side 38 forming a base of the fuel pump module 12 opposite the mounting component 20. The mounting component 20 can be coupled to the housing 32 of the fuel pump module 12 with a spring-loaded mounting or coupling 34. In some constructions, the lower surface 24 of the mounting component 20 may be coupled to the top side 36 of the housing 32 through the spring-loaded coupling 34. For example, compressible struts or guide rods 40 and coil springs 42 can be used as shown in FIG. 2. However, the configuration and/or number of guide rods 40 and coil springs 42 may vary. In other constructions, biasing members other than coil springs 42 may be used (e.g., leaf springs, torsion springs, etc.) and the biasing members need not be positioned about or adjacent the struts 40.

As shown in FIG. 2, the tank opening 50 is at least slightly larger than the widest width or diameter of the fuel pump module 12. Preferably, the tank opening 50 is large enough so that the fuel pump module 12 may be inserted through the tank opening 50 when the fuel level sender assembly 16 is attached to the fuel pump module 12. In some constructions, the tank opening is about 130 mm in diameter. In other constructions, the tank opening 50 is smaller or larger than 130 mm and may be sized according to the particular fuel pump module to be accommodated.

As mentioned above, the fuel tank 14 may include a tank feature 54 that is spaced a distance away from the tank opening 50 along a second direction B. The tank feature 54 defines an assembly position for the fuel pump module 12. The assembly position may not be within the direct line of sight of the tank opening 50 and may be spaced a distance from the tank opening 50 along the second direction B.

As shown in FIGS. 1-6, the tank feature 54 may be a depression formed in an outer surface of the top wall 44, which results in the tank feature 54 forming a protrusion extending further into a volume of the fuel tank 14 than the directly adjacent portions of the top wall 44. As shown, the upper surface 22 of the mounting component 20 can be shaped to match a contour of the tank feature 54 such that when the upper surface 22 of the mounting component 20 engages the tank feature 54, the mounting component 20 is substantially inhibited of movement laterally (i.e., along the second direction B) with respect to the fuel tank 14. In some constructions, the depression providing the tank feature 54 may be provided in the fuel tank 14 to accommodate a vapor vent line 58. In other constructions, the tank 14 may be formed to accommodate other vehicle components (e.g., fuel line, brake line, electrical wires, vehicle frame or suspension, exhaust, etc.). The depression forming the tank feature 54 can extend across the entire top wall 44 of the fuel tank 14, a majority thereof, or may be formed in a particular location only. In some constructions, the tank feature 54 may define a minimum height H1 of the cavity 48 (i.e., the height at which the top wall 44 is closest to the bottom wall 46 of the tank 14), away from the opening 50 of the fuel tank 14. In other constructions the tank feature 54 may not protrude into the tank 14, but may have an alternate shape to which the shape of the mounting component conforms. For example, the tank feature 54 and the mounting component 20 can be mirrored across a horizontal plane (e.g., defined by or parallel to the top wall 44) such that the tank feature 54 extends outwardly from the directly adjacent portions of the top wall 44 of the fuel tank 14.

In some constructions, the fuel tank 14 can be a one-piece blow molded component as opposed to a multi-piece tank formed with two or more separately-formed main portions that must be joined to define an enclosing chamber for fuel. When blow molding, it is only possible to form the tank shape from the outside, as the only thing inside the cavity 48 is air during the molding process. Thus, it is impossible to mold an additional retention feature directly to the inside surface of the fuel tank 14 at the desired location for mounting the fuel pump module 12. Although multi-piece tanks provide full internal access to the cavity 48 to mount components such as the fuel pump module 12, such tanks require substantial assembly efforts to secure and seal the pieces together to form a functional tank. Thus, there are many circumstances where one-piece tanks are preferred or demanded. Some such examples occur in the automotive industry for passenger vehicles, and may also occur in other vehicles including but not limited to agriculture vehicles, construction vehicles, lawn and garden vehicles, and off-road power sports vehicles. Due to space constraints of modern vehicles, some or all portions of the fuel tank 14 may have a very limited height between the top and bottom walls 44, 46, and the fuel tank 14 may be formed with a shape that closely conforms to other surrounding portions of the vehicle.

A mounting location 60 is provided at a position directly under the tank feature 54. The mounting location 60 may be at least partially defined by a pocket 62 formed in the bottom wall 46 of the fuel tank 14 for securing the bottom end of the fuel pump module 12 (e.g., the bottom side 38 of the housing 32). As such, the pocket 62 is shaped to receive the housing 32 of the fuel pump module 12. In the construction illustrated in FIGS. 2-6, the pocket 62 may be defined by a first retention feature 66 positioned on a side of the pocket 62 spaced furthest from the tank opening 50 and a second retention feature 68 positioned on the side of the pocket 62 closest to the tank opening 50. Although each of the retention features 66, 68 has a shape and configuration operable to substantially inhibit or prevent lateral movement of the fuel pump module 12 when positioned in the pocket 62, the second retention feature 68 is further provided with a guide feature to facilitate assembly. The second retention feature 68 can include an upper ramp surface 70 which begins (remote from the pocket 62) at a height substantially consistent with that of the prevailing or surrounding bottom wall 46 of the fuel tank 14. In a direction toward the pocket 62, along the second direction B, the upper ramp surface 70 extends upward toward the top wall 44 of the tank 14. Rather than an abrupt ramping, the height of the upper ramp surface 70 increases gradually (e.g., a lateral-to-vertical ratio of 3:1 or greater) and in some constructions generally consistently (e.g., linearly) without any areas of steep increase. In the direction of lateral insertion toward the pocket 62, the upper ramp surface 70 stops at a peak height and the second retention feature 68 includes an abrupt height decrease forming a retention surface 72 for contacting and/or retaining the fuel pump module 12 (e.g., the module housing 32). The first retention feature 66 may also include an upper ramp surface 74 and a retention surface 76, but the upper ramp surface 74 of the first retention feature 66 may have a steeper slope than the upper ramp surface 70 of the second retention feature 68, or may be omitted entirely. Whether an upper ramp surface 74 is provided or not, the first retention feature 66, and particularly the retention surface 76, forms a backstop for limiting movement of the fuel pump module 12 in the second direction B during and after assembly. In other constructions, the first retention feature 66 and the second retention feature 68 may be substantially identical.

In the illustrated embodiment, the retention features 66, 68 are formed separately from the fuel tank 14 (e.g., in one or more pieces) and coupled to the fuel tank 14. For example, the retention features 66, 68 can be molded from a material similar to the fuel tank 14 (e.g., polyethylene) and hot plate welded to the bottom wall 46 of the fuel tank 14. Of course, the fuel tank 14 and/or the retention features 66, 68 can be formed of other materials such as metal (e.g., aluminum). If formed separately from the tank 14, the retention features 66, 68 can be part of a fully annular retention feature or any desired number of separate members can be used to form the retention features 66, 68 and thus, the pocket 62.

Although the pocket 62 can be formed with separate retention features, each independently secured to the bottom wall 46 as explained above, the pocket 62 may also be formed directly in the bottom wall 46 of the fuel tank 14. For example, retention features can be formed integrally as a single piece (e.g., during molding) with the fuel tank 14. The retention features may be molded into the bottom wall 46 of the fuel tank 14 and shaped substantially similarly to the illustrated retention features 66, 68 to provide the same or similar function. The molded retention features may be shaped in the mold of the fuel tank 14 such that no additional assembly is required after finishing the molding of the fuel tank 14. Whether integral with the fuel tank 14 or not, the retention features 66, 68 forming the pocket 62 can extend continuously about a full circumference or periphery, or may be formed by spaced apart peripheral segments. It is also noted that some constructions of the invention may reverse the tank feature 54 and the retention features 66, 68 between the top wall 44 and the bottom wall 46, and it is envisioned that the fuel pump module 12 or other component having the mounting component 20 may be mounted between any first and second opposed walls of a fuel tank.

In other constructions, the portion of the bottom wall 46 directly under the tank feature 54 may not necessarily include any additional retention features, molded or otherwise, and the bottom wall 46 may be substantially flat in the area of the mounting location 60.

Although the mounting location 60 of the fuel pump module 12 can be remote from the fuel tank opening 50 through which the fuel pump module 12 is inserted, assembly of the fuel pump module 12 is relatively simplified due to the construction of the features described above, as shown in FIGS. 2-6. For example, the fuel pump module 12 can be inserted (from the position of FIG. 2) through the tank opening 50 and moved along the second direction B toward the mounting location 60 provided by the tank feature 54 and the pocket 62. To insert the fuel pump module 12 through the opening, the float 18 and the fuel level sender assembly 16 may first be inserted through the opening 50 with the remainder of the fuel pump module 12 in a tilted position (not shown). After the fuel level sender assembly 16 and the float 18 are inside the cavity 48 of the fuel tank 14, the remainder of the fuel pump module 12 is tilted back toward the vertical position (FIG. 2) and subsequently lowered through the opening 50.

An uncompressed height H2 of the fuel pump module 12 may be slightly larger than an internal fuel tank height adjacent the opening 50. Thus, compression of the spring-loaded coupling 34 may be required upon insertion in order to tilt the fuel pump module 12 toward the pocket 62 as shown by the phantom lines and arrows in FIG. 2. The internal height may be measured as a distance between the top wall 44 and the bottom wall 46 along the direction A, and this height varies in the fuel tank 12 along the direction B. In some constructions, the uncompressed height H2 of the fuel pump module 12 may be smaller than the internal fuel tank height along the positions from the opening 50 to the second retention feature 68 for easy maneuvering of the fuel pump module 12 within the fuel tank 14 toward the second retention feature 68.

Once at the assembly location, the mounting component 20 can be placed over the tank feature 54 and the bottom of the fuel pump module 12 can be forced along the upper ramp surface 70 of the second retention feature 68 and into the pocket 62. The ramp surface 70 may be substantially stationary, and the spring-loaded coupling 34 of the mounting component 20 may be deflected or compressed as the fuel pump module 12 traverses the upper ramp surface 70 of the second retention feature 68. In other constructions, the second retention feature 68 may be configured to deflect during assembly of the fuel pump module 12 into the pocket 62, particularly if formed separately from the fuel tank 14 and coupled thereto.

Figure 4:
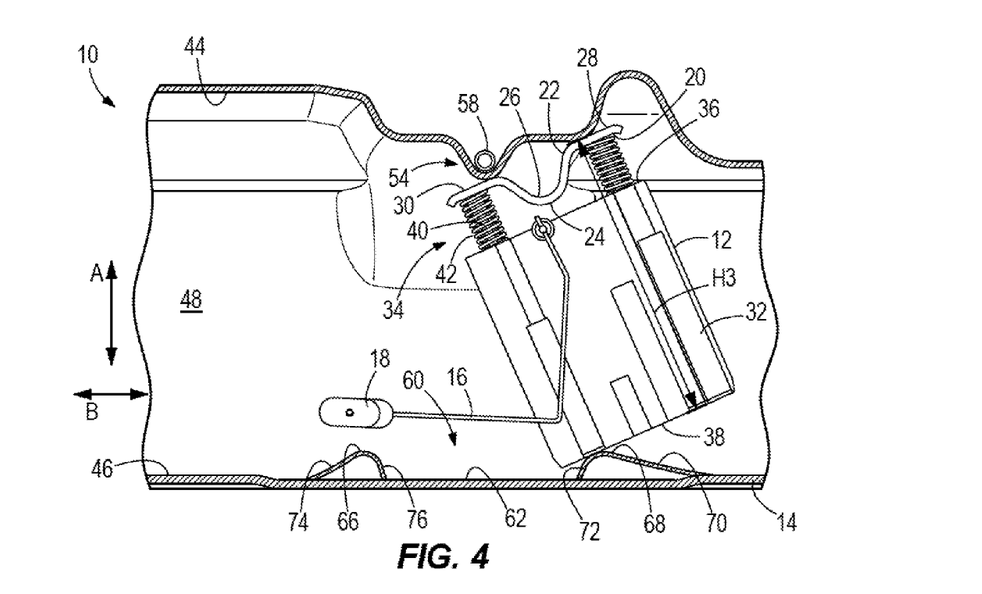
FIG. 4 is a third assembly sequence view of the fuel tank assembly of FIG. 1, illustrating the fuel pump module being maneuvered to a second position within the fuel tank at which the fuel pump module is further engaged with the retention feature at the bottom wall and also a tank feature at a top wall of the fuel tank. The fuel tank is shown in cross-section.
Figure 5:
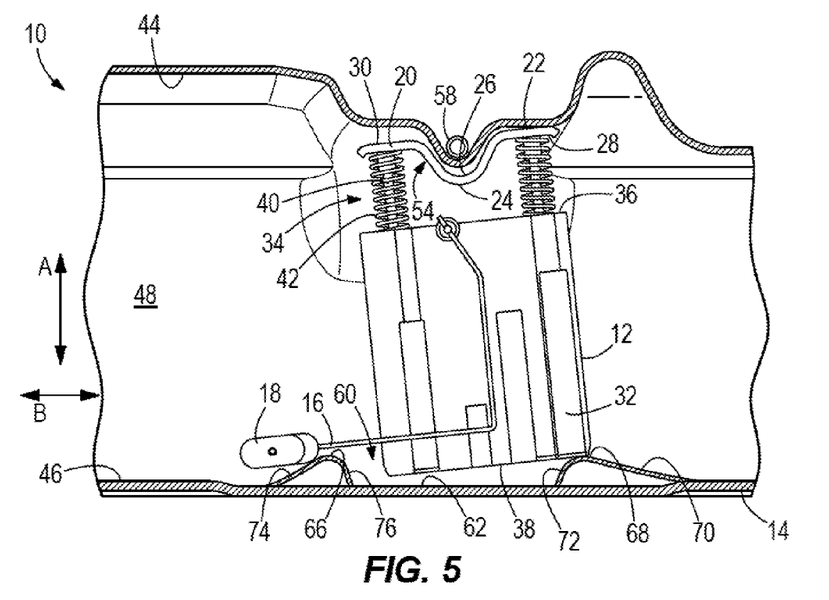
FIG. 5 is a fourth assembly sequence view of the fuel tank assembly of FIG. 1, illustrating the fuel pump module being maneuvered to a third position within the fuel tank, just prior to extending past the retention feature into a mounting location defined by a pocket in the bottom wall of the fuel tank. The fuel tank is shown in cross-section.

As shown in FIG. 4, the mounting component 20 is compressed from the uncompressed height H2 to a reduced height H3 during assembly. In some constructions, the reduced height H3 may be the minimum height of the fuel pump module 12 during assembly. The reduced height H3 may be equal to the minimum direct distance between the tank feature 54 and the second retention feature 68. In other constructions, the fuel pump module 12 is compressed to a height smaller than the minimum direct distance between the tank feature 54 and the second retention feature 68 in order to reach the mounting location 60.

In its assembled position (FIG. 6), the fuel pump module 12 has an assembled height H4 that is less than the uncompressed height H2 so that the spring-loaded coupling 34 between the mounting component 20 and the housing 32 can provide a predetermined amount of pre-load when in the fully assembled position. The assembled height H4 is measured from the bottom side 38 of the housing 32 to the upper surface 22 of the mounting component 20. The difference between the assembled height H4 of the fuel pump module 12 and the height H1 of the fuel tank 14 at the mounting location 60 is equal to a depth of the recess 26 in the mounting component 20.

In other constructions, the fuel pump module 12 can be temporarily locked for assembly in a compressed state, as illustrated by the dashed line position of the mounting component 20 in FIG. 2. The mounting component 20 or a portion of the spring-loaded coupling 34 may be engaged by a locking element 78 to keep the fuel pump module 12 in a locked height H5. The locking element 78 can be a separate, removable element or a feature integral with the fuel pump module 12. The locked height H5 may be the same height as the minimum compressed height H3 required to maneuver the fuel pump module 12 to the pocket 62. As such, the fuel pump module 12 may be maneuvered into the mounting location 60 without requiring any further compression. In other constructions, the locked height H5 may be less than a height between the uppermost point of the second retention feature 68 and the lowermost point of the tank feature 54 as measured along the first direction A. Thus, the fuel pump module 12 may be positioned at the mounting location 60 without requiring any tilting or rotation of the fuel pump module 12.

Figure 6:
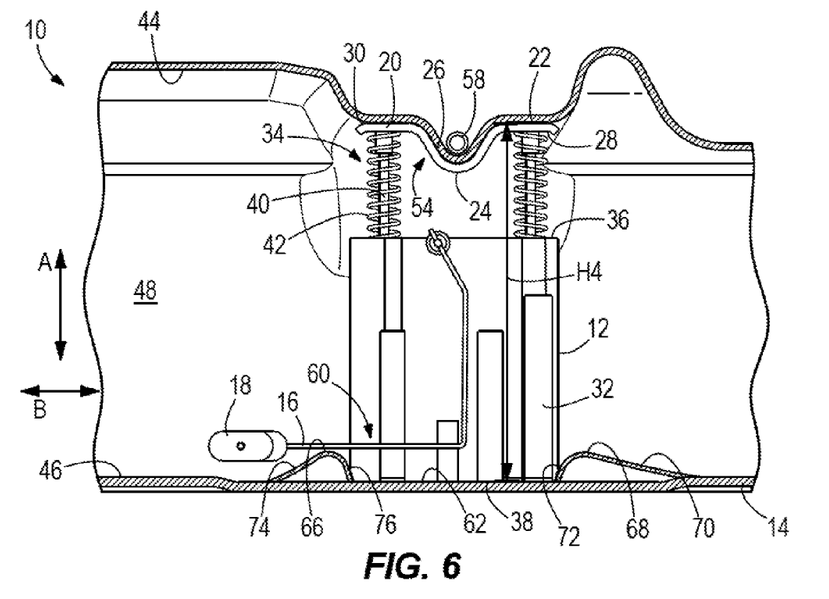
FIG. 6 is a fifth and final assembly sequence view of the fuel tank assembly of FIG. 1, illustrating the fuel pump module positioned within the mounting location of the fuel tank. The fuel tank is shown in cross-section.

When at the mounting location 60, the fuel pump module 12 is placed into engagement with the tank feature 54 or the pocket 62, and the locking element 78 is released or removed, releasing the spring-loaded mounting component 20 from the locked state to allow the fuel pump module 12 to fill the mounting location 60. The mounting component 20 extends with respect to the housing 32 into the final assembly configuration, as illustrated by FIG. 6, by way of the spring-loaded coupling 34. In the final assembly configuration, the spring-loaded coupling 34 can maintain some compression to provide an assembly preload force, as similarly described above.

The fuel pump module 12 can be installed to the fuel tank 14 by snapping securely into place immediately upon being positioned in the mounting location 60, and the further manipulation of any retention device or fastener between the fuel tank 14 and the fuel pump module 12 is not required. Likewise, removal for servicing or replacement is enabled and made simple by un-snapping the fuel pump module 12 from its assembly location. By utilizing one or more structures of the fuel tank 14, some of which may already exist for another purpose (i.e., the depression for the vapor vent line 58), minimal components, cost, and re-engineering of the fuel tank 14 are required.

The invention can be provided as any one of a novel fuel tank, fuel pump module or other in-tank functional fuel system component, component mounting feature, manufacturing or assembly method of a fuel pump module with a fuel tank, or any combination of the above. Various features and advantages of the invention are set forth in the following claims.

What is claimed is:

1. A fuel pump module for installation between top and bottom walls of a fuel tank, the fuel pump module comprising:
    a housing including a top side and a bottom side opposite the top side, wherein the housing defines a space accommodating a pump; and
    a mounting component coupled to the housing and spaced from the housing in a first direction, the mounting component including a first surface, a second surface opposite the first surface and facing the housing, a first end, and a second end opposite the first end and separated from the first end along a second direction,
    wherein the mounting component and the housing are joined with a spring-loaded coupling such that the mounting component is urged away from the housing in the first direction,
    wherein the mounting component further includes a U-shaped recess that is concave on the first side of the mounting component,
    wherein the bottom side of the housing forms a first distal end of the fuel pump module for engaging the bottom wall of the fuel tank, and
    wherein the first surface of the mounting component forms a second distal end of the fuel pump module for engaging the top wall of the fuel tank.

2. The fuel pump module according to claim 1, wherein the mounting component is formed from a sheet of uniform material thickness such that the second side follows the contour of the first side.

3. The fuel pump module according to claim 1, wherein the first surface of the mounting component includes flat portions between the U-shaped recess and the respective first and second ends.

4. The fuel pump module according to claim 1, wherein the second side of the mounting component is convex in an area of the U-shaped recess.

5. The fuel pump module according to claim 1, wherein the spring-loaded coupling includes a first compressible strut coupled to the mounting component and the housing, and a first biasing member positioned about the first strut.

6. The fuel pump module according to claim 5, wherein the spring-loaded coupling includes a second compressible strut coupled to the mounting component and the housing, and a second biasing member positioned about the second strut, wherein the second strut is spaced from the first strut along the second direction.

7. The fuel pump module according to claim 6, wherein the first biasing member and the second biasing member are coil springs.

8. A fuel tank assembly comprising:
    a fuel tank including
        a cavity configured to store fuel,
        an opening providing access to the cavity,
        a bottom wall having at least one retention feature that defines a mounting location; and
        a top wall spaced from the bottom wall in a first direction, the top wall having a tank feature spaced from the opening in a second direction, wherein the top wall is continuous along the tank feature to define a contour facing the cavity; and
    an in-tank functional fuel system component positioned within the cavity, the in-tank functional fuel system component including
        a base defining a first end,
        a mounting component having an upper surface that engages the tank feature of the top wall of the fuel tank, and
        a spring-loaded coupling urging the mounting component away from the base in the first direction,
    wherein the upper surface of the mounting component is shaped to match the contour of the tank feature to secure the in-tank functional fuel system component in a position spaced away from the opening in the second direction, and
    wherein the spring-loaded coupling provides an assembly preload between the in-tank functional fuel system component and the fuel tank when the base is positioned at the mounting location and the upper surface of the mounting component is engaged with the tank feature.

9. The fuel tank assembly according to claim 8, wherein the tank feature includes a depression along the top wall such that the depression is closer to the bottom wall in the first direction than a portion of the top wall immediately adjacent the depression in the second direction.

10. The fuel tank assembly according to claim 9, wherein the upper surface includes a U-shaped recess shaped complementary to the depression of the tank feature such that the depression is positioned at least partially within the recess.

11. The fuel tank assembly according to claim 9, wherein the depression and the mounting location are aligned along the first direction.

12. The fuel tank assembly according to claim 8, wherein the in-tank functional fuel system component is a fuel pump module, and wherein the at least one retention feature includes a first retention feature providing a backstop for the fuel pump module during assembly, and a second retention feature spaced a distance from the first retention feature and providing a ramp surface for guiding the fuel pump module into the mounting location, and wherein a space between the first and second retention features defines the mounting location.

13. The fuel tank assembly according to claim 12, wherein the first and second retention features each include an upper ramp surface having respective slopes with respect to the bottom wall, and wherein the slope of the upper ramp surface of the second retention feature is smaller than the slope of the upper ramp surface of the first retention feature.

14. The fuel tank assembly according to claim 12, wherein one or both of the first and second retention features is integrally formed with the tank.

15. The fuel tank assembly according to claim 8, wherein the fuel tank is a one-piece blow molded component such that the top wall and the bottom wall are integrally formed as a single piece, without any joint therebetween.

16. The fuel tank assembly according to claim 8, wherein the top wall and the bottom wall are parallel, such that the first direction is perpendicular to the top and bottom walls and the second direction is parallel to the top and bottom walls.

17. The fuel tank assembly according to claim 8, wherein the spring-loaded coupling includes a first compressible strut and a first biasing member positioned about the first strut.

18. The fuel tank assembly according to claim 17, wherein the spring-loaded coupling includes a second compressible strut and a second biasing member positioned about the second strut, wherein the second strut is spaced from the first strut along the second direction.

19. The fuel tank assembly according to claim 18, wherein the first biasing member and the second biasing member are coil springs.

20. A method for assembling a vehicular fuel tank assembly, the method comprising:
providing an in-tank functional fuel system component having a base and a mounting component movable relative to the base via a spring-loaded coupling, wherein the mounting component includes a first surface facing away from the base, and wherein the spring-loaded coupling urges the mounting component away from the base;
providing a fuel tank having a first wall, a second wall, a cavity, and an opening, wherein the cavity is configured to store fuel, wherein the opening provides access to a mounting location in the cavity between the first wall and the second wall, wherein the first wall is spaced from the second wall in a first direction, wherein the first wall includes at least one retention feature that defines the mounting location, and wherein the second wall includes a tank feature spaced from the opening in a second direction;
inserting the in-tank functional fuel system component into the cavity through the opening of the fuel tank;
maneuvering the in-tank functional fuel system component along the second direction into the mounting location out of sight from the opening with the spring-loaded coupling in a compressed state in which the in-tank functional fuel system component defines a first height; and
relieving compression in the spring-loaded coupling once the in-tank functional fuel system component is located within the mounting location, by extending the in-tank functional fuel system component to a second height.

* * * * *